United States Patent
Barakam et al.

(10) Patent No.: US 9,674,775 B2
(45) Date of Patent: Jun. 6, 2017

(54) DEVICE AND METHOD FOR PERFORMING CELL SEARCH

(71) Applicant: Samsung Electronics Co., Ltd., Gyeonggi-do (KR)

(72) Inventors: Krishna Mohan Barakam, Bangalore (IN); Nitin Jain, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/136,299

(22) Filed: Apr. 22, 2016

(65) Prior Publication Data

US 2016/0316421 A1    Oct. 27, 2016

(30) Foreign Application Priority Data

Apr. 22, 2015 (IN) .......................... 2052/CHE/2015
Mar. 23, 2016 (IN) .......................... 2052/CHE/2015

(51) Int. Cl.
  *H04J 3/17*   (2006.01)
  *H04W 48/16*  (2009.01)
  *H04B 17/318* (2015.01)

(52) U.S. Cl.
  CPC .......... *H04W 48/16* (2013.01); *H04B 17/318* (2015.01)

(58) Field of Classification Search
  CPC ... H04W 48/16; H04W 16/14; H04W 72/044; H04B 17/318

USPC ......................................... 455/436–444, 453
See application file for complete search history.

(56) References Cited

U.S. PATENT DOCUMENTS

| 9,485,718 B2 * | 11/2016 | Vuchula | H04W 48/16 |
| 2014/0256327 A1 * | 9/2014 | Wang | H04W 48/20 455/437 |
| 2015/0382285 A1 * | 12/2015 | Anand | H04W 36/0061 455/436 |

* cited by examiner

*Primary Examiner* — Wayne Cai
(74) *Attorney, Agent, or Firm* — The Farrell Law Firm, P.C.

(57) ABSTRACT

A method for performing a cell search in a multi-subscription device is provided. The method includes estimating, by a first subscriber identity module (SIM) of multiple SIMs of the multi-subscription device, search time information required for identifying one cell and margin time information for cell search, where the first SIM is associated with a first radio access technology (RAT); obtaining a discontinuous reception (DRX) period of a second SIM associated with a second RAT in the multi-subscription device; determining a number of cells to be searched during the DRX period based on the estimated information; performing a measurement for one or more cells to be searched based on the number of the cells; ranking the one or more cells based on the measurement; and initiating a cell search on one or more cells having a highest signal strength during the DRX period.

20 Claims, 6 Drawing Sheets

DEVICE AND METHOD FOR PERFORMING CELL SEARCH

PRIORITY

This application claims priority under 35 U.S.C. §119(a) to an Indian Provisional Patent Application filed on Apr. 22, 2015 in the Indian Intellectual Property Office and assigned Serial No. 2052/CHE/2015 (PS), and an Indian Complete Patent Application filed on Mar. 23, 2016 in the Indian Intellectual Property Office and assigned Serial No. 2052/CHE/2015 (CS), the entire contents of each of which are incorporated herein by reference.

BACKGROUND

1. Field of the Disclosure

The present disclosure relates generally to a multi-subscription device, and more particularly, to a method for reducing a conflict during a cell search procedure in a multi-subscription device.

2. Description of the Related Art

There is an increasing demand for devices that can support multiple subscriptions, thereby supporting simultaneous wireless, e.g., cellular, access with different networks, such as different public land mobile networks (PLMNs) and/or networks operated by different carriers and/or different network operators. In order to support multiple subscriptions, devices, such as mobile terminals, may include multiple subscriber identity modules (SIMs). In this regard, devices that include two SIMS are often referred to as dual SIM devices. However, devices may include any number of SIMs for supporting three, four, five or more subscriptions.

In some wireless networks, a user equipment (UE) may have multiple subscriptions to one or more networks (e.g., by employing multiple SIM cards or otherwise). Such a UE may include, but is not limited to, a dual-SIM, dual standby (DSDS) device.

In DSDS devices, the user may establish a call, such as a voice call, data call, data session, text messaging session, or any other data transfer session, via one of two subscriptions. Because most DSDS devices contain a single radio resource, such as a transceiver, where a first subscription has established an ongoing call with a first subscription network, the UE must tune the transceiver to a second subscription to receive necessary paging signals and to transmit, for example, message acknowledgement signals and/or measurement indication signals. Therefore, while the first subscription continues an ongoing call, the transceiver may periodically tune away from the first subscription to the second subscription to receive such necessary paging and/or control information.

In some situations, such as where a UE reselects a new cell for one of its subscription services, it must undertake a cell search procedure. A cell search procedure typically includes a series of synchronization stages by which the mobile device determines parameters that are necessary to demodulate a downlink and to transmit uplink symbols with correct timing. In multi-radio access technology systems, a cell search procedure is performed for a plurality of radio access technologies. For example, the multi-radio access technology system may include global system for mobile communications (GSM), wideband code division multiple access (WCDMA) and long term evolution (LTE). A mobile device then undertakes a cell search for any radio access technology (RAT) it can operate and more in time division duplex (TDD) systems where uplink and downlink switching is frequent.

Further, a cell search procedure is divided across multiple layers and upper layers will not be able to know about conflicts at lower layers. A search time for one frequency may vary from technology to technology and is also time dependent upon the procedures at the lower layer.

In any DSDS device, where radio frequency (RF) resources are shared across many SIMs when a cell search procedure is initiated on one SIM, another SIM is required to perform periodic procedures like reading paging/measurements at the same time. During the scanning of frequencies, the RF may be taken away by the other SIM, resulting in an interruption, thereby causing a performance reduction. If multiple frequencies are being scanned during a cell search procedure, interruptions from another SIM may cause the procedure to provide incomplete results, thus leading to a failure.

Figure 1:
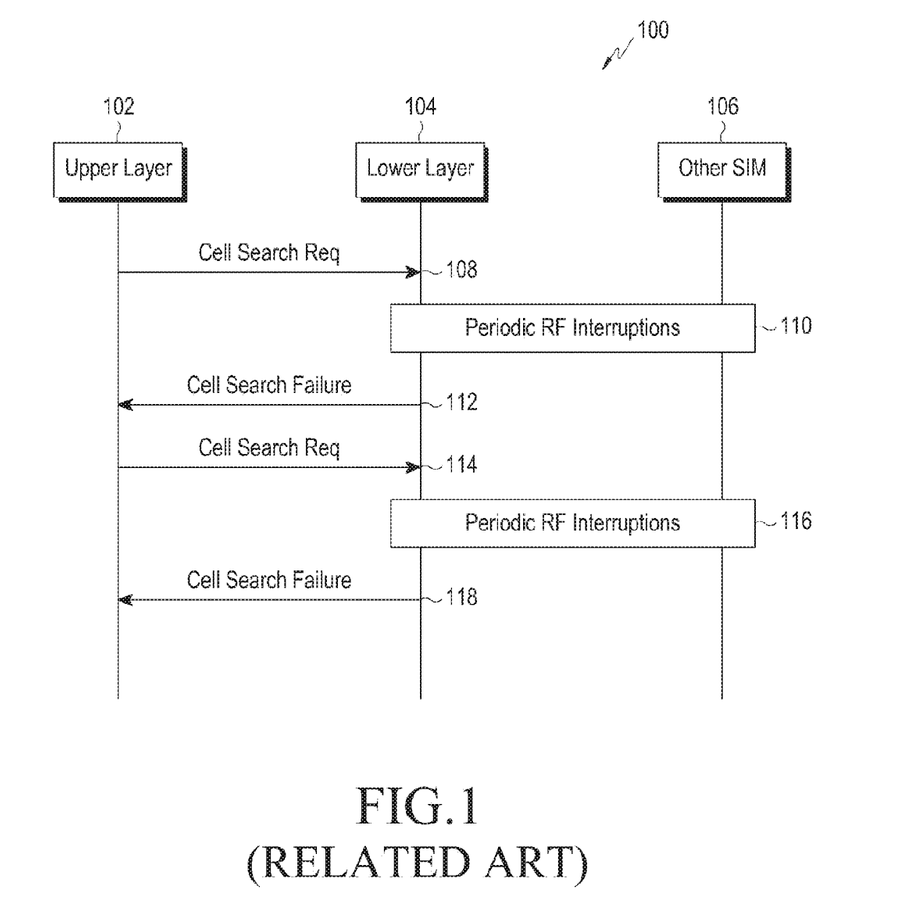
FIG. 1 is a flow diagram representing a cell search procedure, according to the related art.

FIG. 1 is a flow diagram 100 illustrating periodic RF interruptions during cell search, according to the related art.

Referring to FIG. 1, the flow diagram 100 includes an upper layer 102, a lower layer 104 and another SIM 106. Initially, the resources are assigned to a different SIM and the different SIM may perform any procedure, such as, but not limited to, a call, such as a voice call, a data call, a data session, text messaging session, any other data transfer session, and the like. The other SIM 106 which is idle requires RF resources to perform periodic paging searches and other related tasks. If the resources are within the other SIM 106, the upper layer 102 transmits a cell search request to the lower layer 104 in step 108. Upon receiving the cell search request, the lower layer 104 receives periodic RF interruptions from the other SIM 106 in step 110. Upon receiving period RF interruptions, the lower layer 104 transmits a cell search failure to the upper layer 102 in step 112. The process of transmitting a cell search request and a cell search failure continues between the upper layer 102 and the lower 104 in steps 114, 116, and 118 while the resources are within the other SIM 106.

Figure 2:
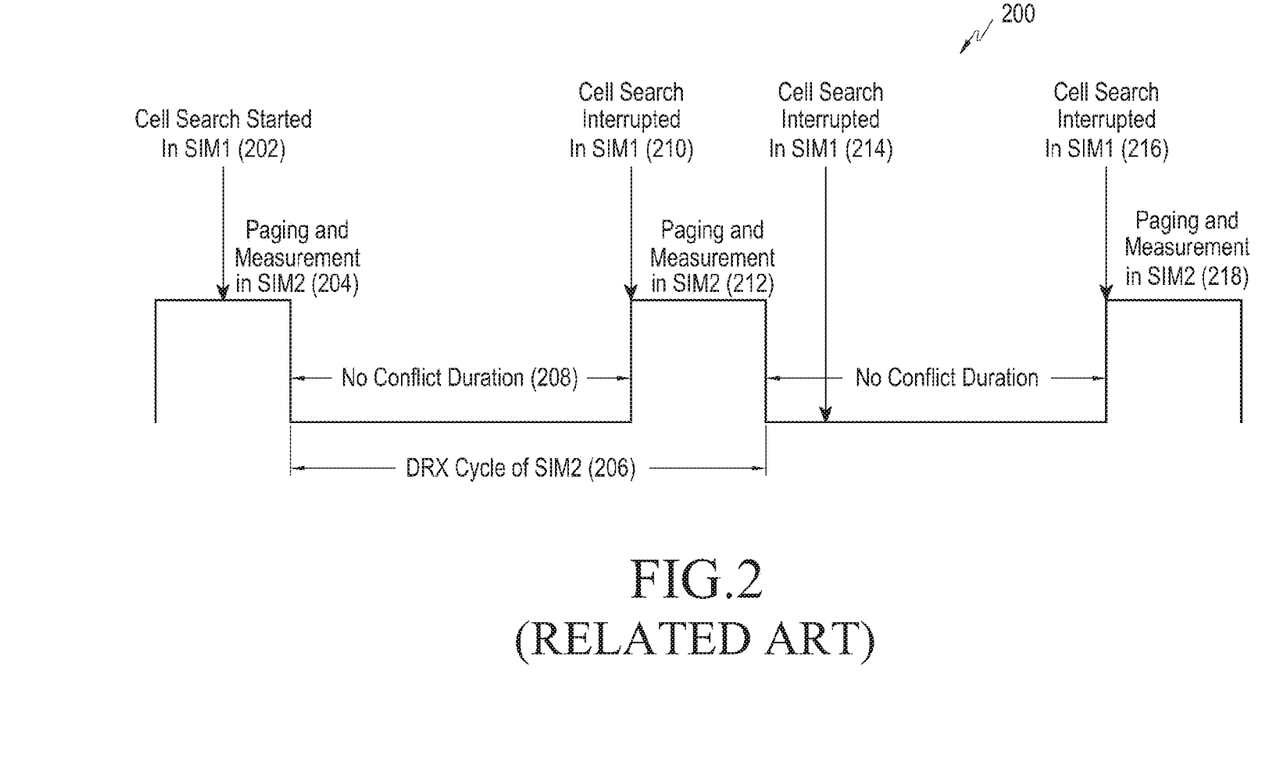
FIG. 2 is a diagram illustrating a cell search procedure, according to the related art.

FIG. 2 is a diagram 200 illustrating signaling information during cell search interruption of a first SIM (SIM1), according to the related art.

Referring to FIG. 2, initially, RF resources are assigned to the SIM1 while a second SIM (SIM2) is in an idle state. During an active state, the SIM1 initiates cell searching in step 202. During a cell search of SIM1, SIM2 receives paging and measurement information in step 204 and, thus, the resources assigned to SIM1 are shared with SIM2. After a certain period of time, a discontinuous reception (DRX) cycle of SIM2 starts in step 206 and, thus, the resources remain with SIM2. Since the resources are with SIM2, no conflict arises in step 208 and SIM1 continues to wait for the resources for performing a cell search.

After a certain time, a timer expires for SIM1 as SIM1 does not receive the resources and, thus, the cell search of SIM1 is interrupted in step 210. After a certain time period, SIM2 receives paging and management information in step 212, and continues accessing the resources. After a certain time interval, SIM1 attempts to access the resources for a cell search and identifies that the resources are with SIM2 in step 214. Thus, SIM1 continues to wait for the certain time period to receive the resources. Upon the expiration of the timer, SIM1 identifies that the resources are unavailable since they are with SIM2, the cell search of SIM1 is interrupted in step 216, and SIM2 receives paging and management information in step 218.

In view of the foregoing, there is a need for a system and method to reduce conflict during a cell search procedure in multi-subscription devices, such as DSDS devices.

SUMMARY

An aspect of the present disclosure provides a method for reducing conflict during a cell search procedure in a multi-subscription device.

Another aspect of the present disclosure provides a method of initiating cell search on a plurality of remaining cells within one DRX period, and identifying a cell having a highest signal strength to complete a cell selection process.

Another aspect of the present disclosure provides one or more cells ranked based on an RSSI or any other available metric which indicates the quality of a received signal strength, where the one or more cells for cell searching is obtained from, but is not limited to, preconfigured cell selection results, signal strength obtained by RSSI scan of a full frequency band, and the like.

Another aspect of the present disclosure provides a first RAT and a second RAT selected from a group of RATs including a GSM, code division multiple access (CDMA), LTE, and a universal mobile telecommunications system (UMTS).

Another aspect of the present disclosure provides a method for transmitting, by a lower layer, a message indicating a start time and a stop time of a DRX cycle of an upper layer, and initiating a cell search with received time information in case of a conflict at a lower layer, wherein the start time and the stop time of the DRX cycle are pre-stored in a reference table.

In accordance with an aspect of the present disclosure, a method for performing a cell search in a multi-subscription device is provided. The method includes estimating, by a first subscriber identity module (SIM) of multiple SIMs of the multi-subscription device, search time information required for identifying one cell and margin time information for cell search, where the first SIM is associated with a first radio access technology (RAT); obtaining a discontinuous reception (DRX) period of a second SIM associated with a second RAT in the multi-subscription device; determining a number of cells to be searched during the DRX period based on the estimated information; performing a measurement for one or more cells to be searched based on the number of the cells; ranking the one or more cells based on the measurement; and initiating a cell search on one or more cells having a highest signal strength during the DRX period.

In accordance with another aspect of the present disclosure, a multi-subscription device for performing a cell search is provided. The multi-subscription device includes a processor configured to estimate search time information required for identifying one cell and margin time information for cell search, where the first SIM is associated with a first radio access technology (RAT); obtain a discontinuous reception (DRX) period of a second SIM associated with a second RAT in the multi-subscription device; determine a number of cells to be searched during the DRX period based on the estimated information; perform a measurement for one or more cells to be searched based on the number of the cells; rank the one or more cells based on the measurement; and initiate a cell search on one or more cells having a highest signal strength during the DRX period.

In accordance with another aspect of the present disclosure, a chip set for performing a cell search in a multi-subscription device is provided. The chip set is configured to estimate, by a first subscriber identity module (SIM) of multiple SIMs of the multi-subscription device, a search time information required for identifying one cell and a margin time information for cell search, where the first SIM is associated with a first radio access technology (RAT); obtain a discontinuous reception (DRX) period of a second SIM associated with a second RAT in the multi-subscription device; determine a number of cells to be searched during the DRX period based on the estimated information; perform a measurement for one or more cells to be searched based on the number of the cells; rank the one or more cells based on the measurement; and initiate a cell search on one or more cells having a highest signal strength during the DRX period.

BRIEF DESCRIPTION OF THE DRAWINGS

The above and other aspects, features and advantages of the present disclosure will be more apparent to those skilled in the art from the following description, taken in conjunction with the accompanying drawings, in which.

DETAILED DESCRIPTION OF EMBODIMENTS OF THE PRESENT DISCLOSURE

The present disclosure provides a method for handling a cell search in a multi-subscription device. In the following detailed description of the present disclosure, reference is made to the accompanying drawings that form a part hereof, and in which are shown by way of illustration certain embodiments in which the present disclosure may be practiced. These embodiments are described in sufficient detail to enable those skilled in the art to practice the present disclosure, and it is to be understood that other embodiments may be utilized and that changes may be made without departing from the scope and spirit of the present disclosure. The following detailed description is, therefore, not to be taken in a limiting sense, and the scope of the present disclosure is defined only by the appended claims and their equivalents.

The specification may refer to "an," "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a," "an" and "the" are intended to include the plural forms as well, unless expressly stated otherwise. It will be further understood that the terms "includes," "comprises," "including" and/or "comprising" when used in this specification specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms used herein have the same meanings as commonly understood by one of ordinary skill in the art to which the present disclosure pertains. It will be further understood that terms, such as those defined in commonly used dictionaries, should be interpreted as having meanings that are consistent with their meanings in the context of the relevant art and should not be interpreted in an idealized or overly formal sense unless expressly so defined herein.

The present disclosure provides a method for handling a cell search in a multi-subscription device. The embodiments of the present disclosure are described with respect to a dual SIM device, but the present disclosure may be applied to any multiple SIM device.

According to an embodiment of the present disclosure, a method for handling a cell search in a multi-subscription device, the method includes estimating, by a first SIM of multiple SIMs of the multi-subscription device, a search time required for identifying one cell and a margin time for a cell search, where the first SIM is associated with a first radio access technology. The multi-subscription device may include multiple SIMs. The first SIM of multiple SIMs of the multi-subscription device may be associated with a RAT of a service provider. The first SIM, associated with a first RAT, may estimate the time required for conducting a search with respect to identifying one cell/frequency and a margin time for conducting the cell search.

Further, the method includes obtaining a DRX period of a second SIM associated with a second RAT in the multi-subscription device. The second SIM of the multi-subscription device can be associated with the second RAT and the multi-subscription device can receive DRX period of the second SIM. In an embodiment of the present disclosure, the multi-subscription device can receive DRX period of the second SIM after predetermined periodical intervals. The multi-subscription device may receive the DRX period of the second SIM dynamically as soon as the request is generated.

In an embodiment of the present disclosure, the first SIM and the second SIM may be associated with two different RATs, a first RAT and a second RAT, respectively. The first SIM and the second SIM may be associated with the same RAT. In an embodiment of the present disclosure, the first RAT and the second RAT are respectively selected from a group of RATs including GSM, CDMA, UMTS, LTE, or higher RATs.

Further, the method includes determining a number of cells to be searched within one DRX period. Based on the received DRX period of the second SIM, the multi-subscription device may identify the number of cells to be searched.

Further, the method includes performing an RSSI scan to determine signal strength of one or more cells to be searched. Based on the identified one or more cells, the cell with the greatest signal strength is identified. The identification may be based on the signal strength of the received signal from the one or more cells. Therefore, the multi-subscription device may perform an RSSI scan on the one to more cells to determine signal strength of one or more cells to be searched. The one or more cells for cell searching may be obtained from at least one of, but not limited to, preconfigured cell selection results, signal strength obtained by an RSSI scan of a full frequency band, and the like. The process of performing RSSI is known to those having ordinarily skilled in the art and hence is not described in detail herein.

Further, the method includes ranking the one or more cells based on the RSSI scan. Upon performing the RSSI scan, the multi-subscription device may obtain signal strengths of the cells to be searched. Based on the obtained signal strengths, the multi-subscription device may rank the cells, wherein the one or more cells are ranked based on an RSSI or any other available metric which indicates the quality of the received signal strength. The ranking of the cells may be from lowest to highest signal strength. In another embodiment of the present invention, the ranking of the cells may be from highest to lowest signal strength.

Further, the method includes initiating, by the first SIM, a cell search on one or more cells having the highest signal strength without any interruption from the second SIM. Based on the ranking of the cells, the first SIM may identify the one or more cells with the highest strengths. Based on the identified cells with the highest strengths, the first SIM may initiate a cell search. In an embodiment of the present disclosure, the highest signal strengths of the one or more cells may be based on an RSSI value identified by the multi-subscription device, wherein the signal strength is equal to a predetermined RSSI value. The multi-subscription device may set a threshold for an RSSI value and the first SIM may identify signal strengths of the one or more cells as the highest signal strength if it is greater than the threshold. The multi-subscription device may set upper and lower threshold values, and the first SIM may identify and initiate a cell search for the one or more cells for which the signal strength is within or equal to one of the upper and lower threshold values. A person having ordinarily skilled in the art can understand that cells with a certain RSSI value may be selected using any of the known methods, without departing from the scope of the present disclosure.

According to an embodiment of the present disclosure, the method further includes initiating a cell search on a plurality of remaining frequencies within one DRX period. If the first SIM identifies cells which are not searched and the DRX period is not over, then the first SIM may initiate a cell search on the remaining un-searched cells within the DRX period. Further, the method includes identifying the cell having the highest signal strength, to complete the cell selection process. Within the cells which were not searched, the first SIM may identify the cells with the highest signal strength and may initiate a cell search for the cells with the highest signal strength.

According to an embodiment of the present disclosure, a method of handling a cell search in a multi-subscription device, the method includes estimating, by a first SIM of multiple SIMs of the multi-subscription device and associated with a first RAT, a search time required for identifying one cell, a margin time, a DRX cycle value and DRX timing information of a second SIM associated with a second RAT. The first SIM of the multi-subscription device may be associated with the first RAT and may estimate a search time required for identifying one cell along with the margin time, the DRX cycle value, and the DRX timing information of the second SIM, wherein the second SIM may be associated with the second RAT. The first SIM and the second SIM may be associated with the first RAT and the second RAT, respectively, or may be associated with the same RAT.

Further, the method includes determining a number of cells to be searched within one DRX cycle. Further, the method includes performing an RSSI scan to determine a signal strength associated with each of the one or more cells. A person having ordinarily skilled in the art can understand that any of the known methods may be used to perform an RSSI scan and determine signal strengths of the one or more cells, without departing from the scope of the present disclosure. Further, the method includes ranking the one or more cells based on an RSSI scan. Further, the method includes initiating a cell search on one or more cells having the highest signal strength without any interruption from the second SIM.

In an embodiment of the present disclosure, the method further includes transmitting, by a lower layer, a message indicating a start time and a stop time of a DRX cycle an upper layer. Further, the method includes initiating the cell search with the received time information in case of a conflict at a lower layer, wherein the start time and the stop time of the DRX cycle are pre-stored in a reference table.

Figure 3:
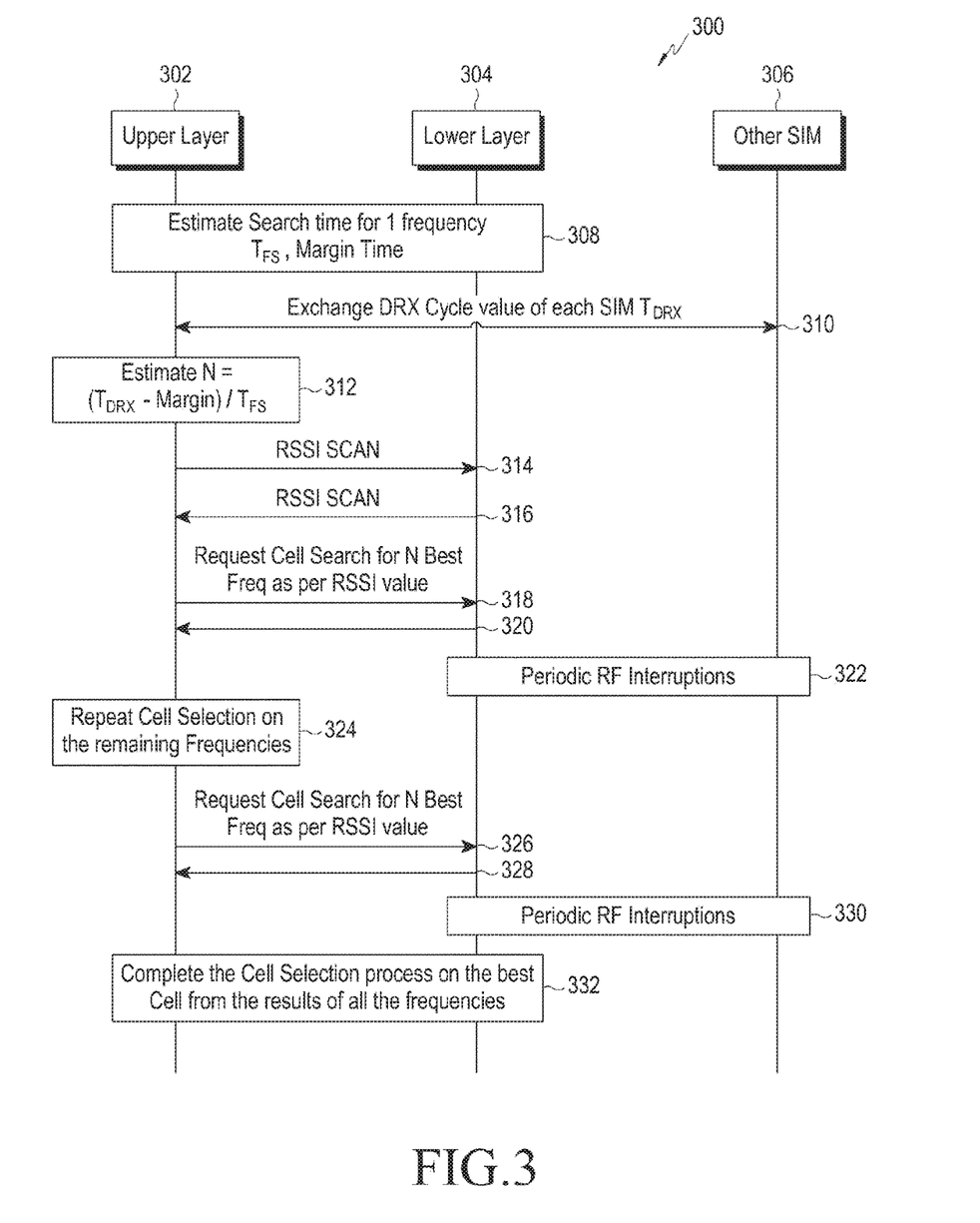
FIG. 3 is a flow diagram representing a cell search procedure in DSDS devices, according to an embodiment of the present disclosure.

FIG. 3 is a flow diagram 300 of a cell search procedure, according to an embodiment of the present disclosure.

Referring to FIG. 3, the flow diagram 300 includes an upper layer 302, a lower layer 304 and another SIM 306. According to the flow diagram 300, the upper layer 302 may estimate a search time for one frequency $T_{FS}$ and a margin time in step 308. Based on the estimated search time and the margin time, DRX cycle value information may be obtained from the other SIM 306 and exchanged with the upper layer 302 in step 310. The DRX cycle can vary based on the type of technology, country, network operator or any other parameter. The UE may also use a pre-stored table with a certain number of entries for a peer SIM DRX cycle. In a case where there are more than two SIMs, the UE may use the minimum of all the values of the DRX cycle of the peer SIMs. Once the DRX cycle value is available, the number of frequencies N that are to be searched in one DRX period $T_{DRX}$ of the peer SIM may be estimated in step 312 using Equation (1) as follows:

$$\text{Estimate } N=(T_{DRX}-\text{Margin})/T_{FS}. \tag{1}$$

In an embodiment of the present disclosure, the number N may also be pre-configured to restrict the search to a certain number of frequencies applicable to all possible DRX cycles.

Further, an initial RSSI scan may be performed in steps 314 and 316 and the frequencies may be ranked according to a predetermined metric. In another embodiment of the present disclosure, any of the known scanning methods that provide frequencies with ranks as metrics corresponding to a certain RAT may be used. Once the ranking is done, a cell search on the N best frequencies is requested in steps 318 and 320 in order to perform the cell search without any interruption from the other SIM 306. If there are any RF interruptions in the other SIM 306 in step 322, then the cell selection on the remaining frequencies may be repeated at the upper layer 302 in step 324 to complete the cell selection process on the best cell. The upper layer 302 may transmit a request to the lower layer 304 in steps 326 and 328 for cell search for N best remaining frequencies. If any RF interruptions in step 330 are observed at the other SIM 306, then the upper layer 302 may complete the cell selection process in step 332 on the best cell from the results of all the frequencies. According to the method, when the DRX timing information is not available at the upper layer 302, the lower layer 304 will retry the request from the upper layer in case of RF conflict.

Figure 4:
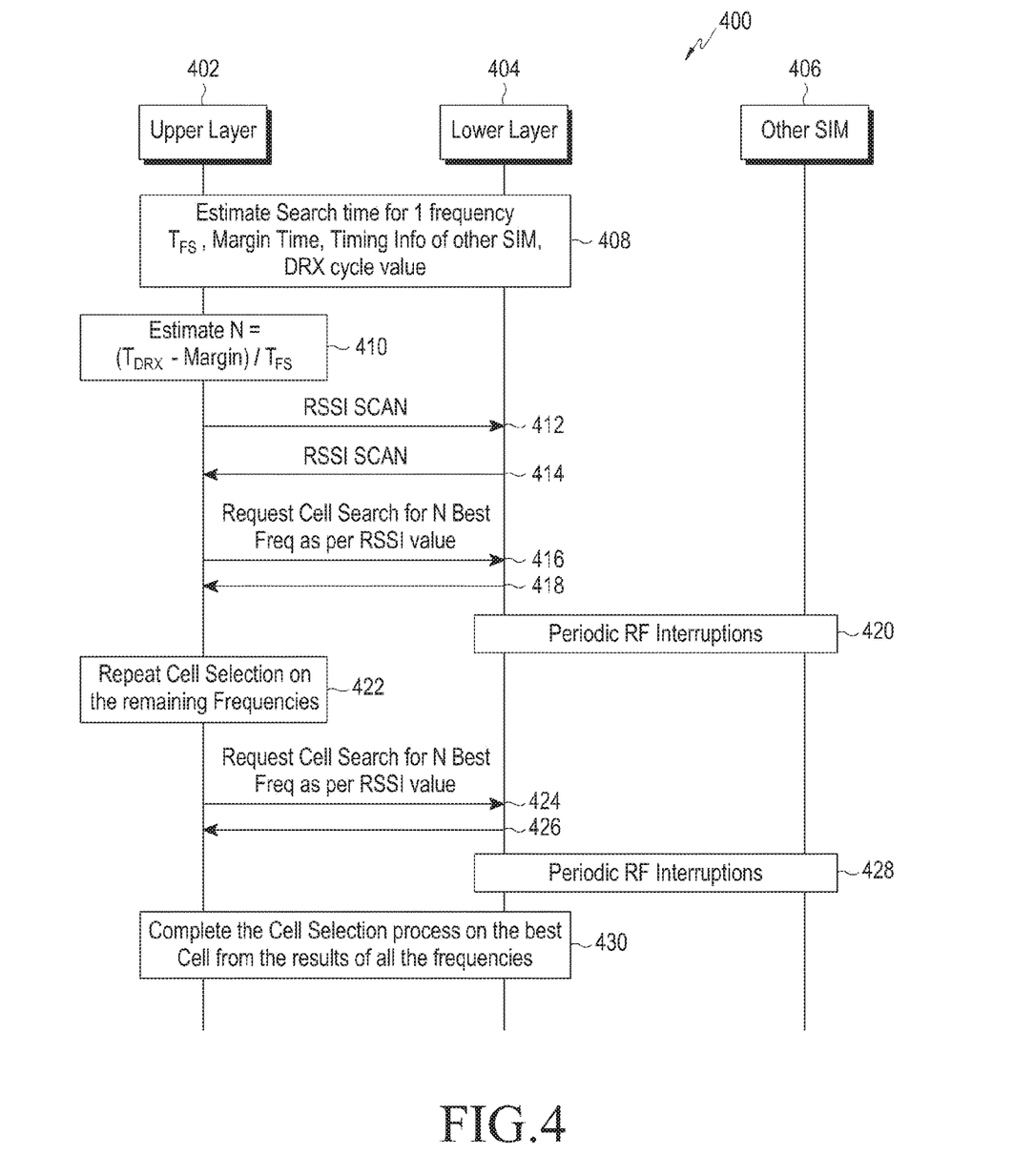
FIG. 4 is a flow diagram representing a cell search procedure in DSDS devices, according to an embodiment of the present disclosure.

FIG. 4 is a flow diagram 400 representing a cell search procedure, according to an embodiment of the present disclosure.

Referring to FIG. 4, the cell search procedure includes an upper layer 402, a lower layer 404, and another SIM 406. According to the flow diagram 400, the search time for one frequency $T_{FS}$, margin time, DRX time and DRX timing information of the other SIM 406 may be estimated by the upper layer 402 in step 408, and the number of frequencies is estimated in step 410 using Equation (1) above, which may be searched as in an embodiment of the present disclosure described above. Further, an initial RSSI scan may be performed in steps 412 and 414 to rank frequencies obtained from the lower layer 404 according to an available metric. Once the ranking is done, a cell search on the N best frequencies is requested in step 416 by the upper layer 402 to the lower layer 404 in order to perform the cell search in step 418 without any interruption from the other SIM 406. If any RF interruptions are observed on the other SIM 406 in step 420, then the cell selection on the remaining frequencies is repeated in step 422 to complete the cell selection process on the best cell in steps 424-430. Any cell search or scan procedure is synchronized with the timing information received from the peer SIM. This avoids any conflict at the lower layers when the cell search procedure is ongoing.

According to the present disclosure, the method for reducing conflicts during cell search in multi-subscription devices is as follows. First, a search time for one frequency from the lower layer, margin time required for other procedures is estimated. Based on the estimation, the DRX value of the other RAT is acquired after which the number of frequencies N to be searched is estimated within one DRX cycle. Further, the start of the cell search procedure is tuned to the DRX cycle of the other SIM 406 at the upper layer 402.

Once the tuning is done, an initial scan is performed on the frequencies to choose the best N frequencies. Frequencies may be acquired from previously stored cell selection results or from a full band scan. After choosing the best N frequencies, the cell search is repeated until all the frequencies are completed. In this method, the start and stop of the DRX cycle is indicated by exchanging messages and the mechanism is retried with time information in case of conflict at the lower layers. The time information is indicated by the lower layer 404 to the upper layer 402, so that the cell search may be adjusted from the upper layer 402 with the DRX cycle from the next cycle onwards. Once the frequency searches are done, the selection procedure on the best cell is completed.

Figure 5:
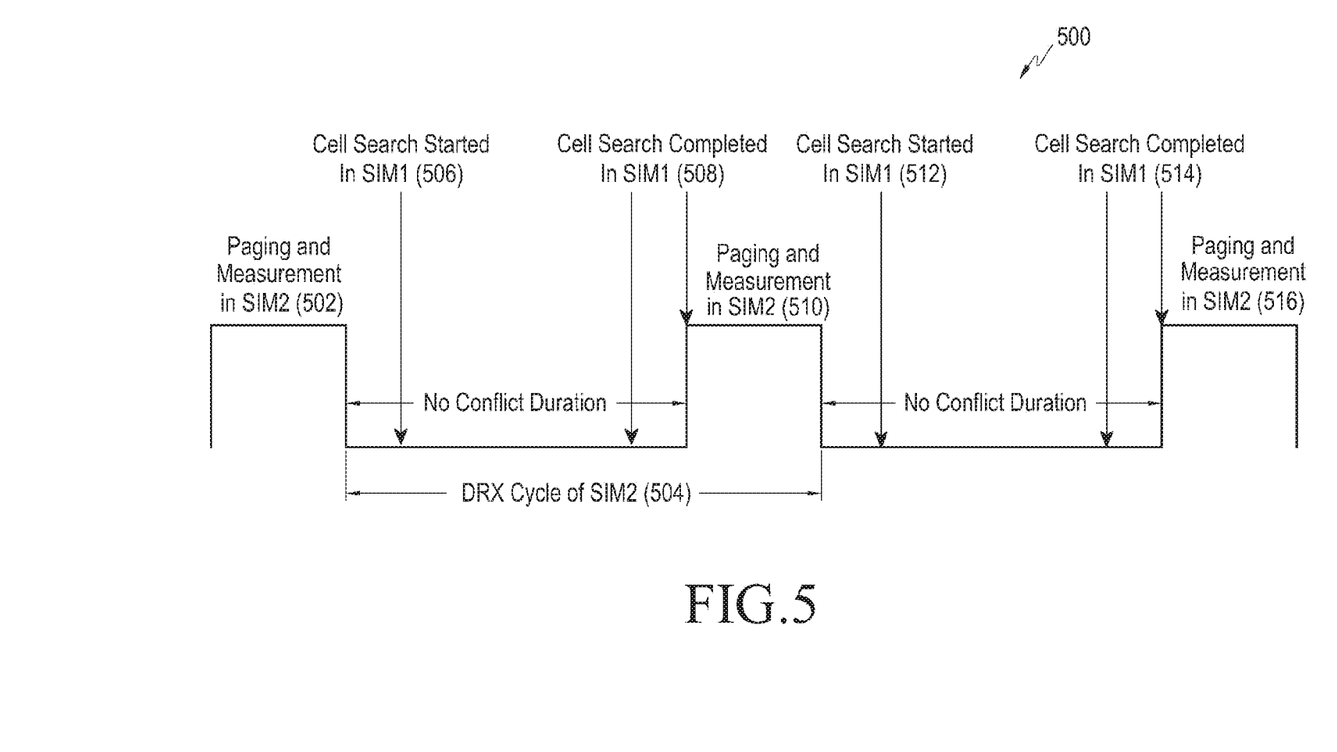
FIG. 5 is a diagram illustrating a cell search procedure without conflicts, according to an embodiment of the present disclosure.

FIG. 5 is a diagram 500 illustrating a cell search procedure without conflicts, according to an embodiment of the present disclosure.

Referring to FIG. 5, initial paging and measurement cycle of SIM 2 is performed in step 502 while SIM1 is waiting for the resources. Upon completion of the paging and measurement cycle, the SIM2 will go into idle mode and a DRX cycle of SIM2 commences in step 504. After a certain time period, a cell search procedure for SIM1 commences in step 506, wherein the SIM1 searches for cells with the best signal strength based on an RSSI scan. The SIM1 identifies the best cell and completes the cell search in step 508 within a no conflict duration. As soon as the cell search is completed, the resources are free, and at the predetermined period, the SIM2 commences paging and measurement in step 510, without any hindrance. The same procedure follows for the fore coming cell searches from SIM1 in steps 512-516.

Figure 6:
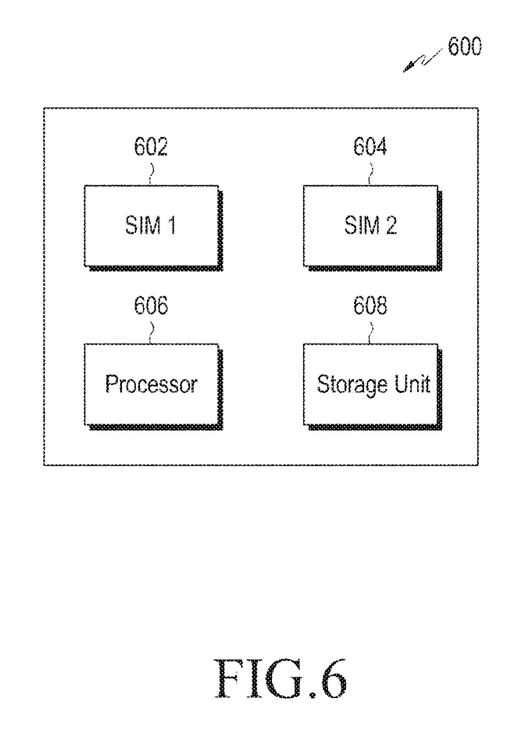
FIG. 6 is a block diagram of a DSDS device, according to an embodiment of the present disclosure.

FIG. 6 is a block diagram of a DSDS device 600, according to an embodiment of the present disclosure.

Referring to the FIG. 6, the DSDS device 600 includes a first SIM (SIM1) 602, a second SIM (SIM2) 604, a processor 606, and a storage unit 608. The first SIM 602 and the second SIM 604 may be dual SIMs which may be associated with the same RATs and camped on same or different cells.

The processor 606 assists the first SIM 602 in estimating a search time required for identifying one cell and a margin time for cell search, where the first SIM 602 is associated with a first RAT. Further, the processor 606 obtains a DRX period of the second SIM 604 associated with a second RAT. Further, the processor 606 determines a number of cells to be searched within one DRX period. Further, the processor 606 performs an RSSI scan to determine signal strength of one or more cells to be searched. Based on the RSSI scan performed, the processor 606 ranks the one or more cells based on the RSSI scan. Further, the processor 606 assists the first SIM 602 in initiating a cell search on one or more cells having the highest signal strength without any interruption from the second SIM 604. The storage unit 608 stores instructions, which are executable by the processor 606 such that the DSDS device 600 is operable to perform a cell search process, as described above with respect to FIGS. 3-5.

The present disclosure has been described with reference to certain embodiments. It is evident that various modifications and changes may be made to these embodiments without departing from the scope and spirit of the present disclosure. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a non-transitory machine readable recording medium. For example, the various electrical devices and methods may be embodied using transistors, logic gates, and electrical circuits, such as an application specific integrated circuit.

Although the present disclosure is described using various embodiments, it will be obvious to a person skilled in the art to practice the present disclosure with modifications. However, all such modifications are intended to be within the scope and spirit of the present disclosure as defined by the appended claims and their equivalents.

What is claimed is:

1. A method for performing a cell search in a multi-subscription device, comprising:
   estimating, by a first subscriber identity module (SIM) of multiple SIMs of the multi-subscription device, search time information required for identifying one cell and margin time information for cell search, where the first SIM is associated with a first radio access technology (RAT);
   obtaining a discontinuous reception (DRX) period of a second SIM associated with a second RAT in the multi-subscription device;
   determining a number of cells to be searched during the DRX period based on the estimated information;
   performing a measurement for one or more cells to be searched based on the number of the cells;
   ranking the one or more cells based on the measurement; and
   initiating a cell search on one or more cells having a highest signal strength during the DRX period.

2. The method of claim 1, wherein the measurement is performed by a received signal strength indication (RSSI) scan.

3. The method of claim 1, further comprising:
   initiating cell search on a plurality of remaining cells within the one DRX period; and
   identifying the cell having the highest signal strength to complete the cell selection process.

4. The method of claim 1, wherein the one or more cells are ranked based on a received signal strength indication (RSSI) or any other available metric which indicates the quality of the received signal strength.

5. The method of claim 1, wherein the one or more cells for cell searching is obtained from:
   preconfigured cell selection results; or
   signal strength obtained by an RSSI scan of a full frequency band.

6. The method of claim 1, wherein the first RAT and the second RAT are selected from a group of RATs comprising a global system for mobile communications (GSM), a code division multiple access (CDMA), long term evolution (LTE), and a universal mobile telecommunications system (UMTS).

7. The method of claim 1, further comprising:
   estimating, by the first SIM of multiple SIMs of the multi-subscription device and associated with the first RAT, the search time information required for identifying one cell, the margin time information, a DRX cycle value and DRX timing information of the second SIM associated with a second RAT.

8. The method of claim 1, further comprising:
   transmitting, by a lower layer, a message indicating a start time and a stop time of the DRX cycle of an upper layer; and
   initiating the cell search with the received time information if there is a conflict at a lower layer, wherein a start time and a stop time of the DRX cycle is pre-stored in a reference table.

9. A multi-subscription device for performing a cell search, comprising:
   a processor configured to:
   estimate search time information required for identifying one cell and margin time information for cell search, where the first SIM is associated with a first radio access technology (RAT);
   obtain a discontinuous reception (DRX) period of a second SIM associated with a second RAT in the multi-subscription device;
   determine a number of cells to be searched during the DRX period based on the estimated information;
   perform a measurement for one or more cells to be searched based on the number of the cells;
   rank the one or more cells based on the measurement; and
   initiate a cell search on one or more cells having a highest signal strength during the DRX period.

10. The device of claim 9, wherein the measurement is performed by a received signal strength indication (RSSI) scan.

11. The device of claim 9, the processor adapted for configured to:
    initiate cell search on a plurality of remaining cells within the one DRX period; and
    identify the cell having the highest signal strength to complete the cell selection process.

12. The device of claim 9, wherein the one or more cells are ranked based on a received signal strength indication (RSSI) or any other available metric which indicates the quality of the received signal strength.

13. The device of claim 9, wherein the one or more cells for cell searching is obtained from:
    preconfigured cell selection results; or
    signal strength obtained by an RSSI scan of a full frequency band.

14. The device of claim 9, wherein the first RAT and the second RAT are selected from a group of RATs comprising a global system for mobile communications (GSM), a code division multiple access (CDMA), long term evolution (LTE), and a universal mobile telecommunications system (UMTS).

15. The device of claim 9, the processor adapted for configured to:
    estimate, by the first SIM of multiple SIMs of the multi-subscription device and associated with the first RAT, the search time information required for identifying one cell, the margin time information, a DRX cycle value and DRX timing information of the second SIM associated with a second RAT.

16. The device of claim 9, the processor adapted for configured to:
    transmit, by a lower layer, a message indicating a start time and a stop time of the DRX cycle of an upper layer; and
    initiate the cell search with the received time information if there is a conflict at a lower layer, wherein a start time and a stop time of the DRX cycle is pre-stored in a reference table.

17. A chip set for performing a cell search in a multi-subscription device configured to:
    estimate, by a first subscriber identity module (SIM) of multiple SIMs of the multi-subscription device, a search time information required for identifying one cell and a margin time information for cell search, where the first SIM is associated with a first radio access technology (RAT);
    obtain a discontinuous reception (DRX) period of a second SIM associated with a second RAT in the multi-subscription device;
    determine a number of cells to be searched during the DRX period based on the estimated information;
    perform a measurement for one or more cells to be searched based on the number of the cells;
    rank the one or more cells based on the measurement; and
    initiate a cell search on one or more cells having a highest signal strength during the DRX period.

18. The chip set of claim 17, wherein the measurement is performed by a received signal strength indication (RSSI) scan.

19. The chip set of claim 17, further configured to:
    initiate cell search on a plurality of remaining cells within the one DRX period; and
    identify the cell having the highest signal strength to complete the cell selection process.

20. The chip set of claim 17, further configured to:
    estimate, by the first SIM of multiple SIMs of the multi-subscription device and associated with the first RAT, the search time information required for identifying one cell, the margin time information, a DRX cycle value and DRX timing information of the second SIM associated with a second RAT.

* * * * *